(12) United States Patent
Bellis, Jr.

(10) Patent No.: US 6,497,422 B1
(45) Date of Patent: Dec. 24, 2002

(54) SULKY WITH REMOVABLE FOOT PLATE

(76) Inventor: William B. Bellis, Jr., 1401 Shuff La., Louisville, KY (US) 40205

( * ) Notice: Subject to any disclaimer, the term of this patent is extended or adjusted under 35 U.S.C. 154(b) by 0 days.

(21) Appl. No.: 09/663,236

(22) Filed: Sep. 15, 2000

Related U.S. Application Data

(63) Continuation-in-part of application No. 09/474,383, filed on Dec. 29, 1999, now Pat. No. 6,145,855.
(60) Provisional application No. 60/141,186, filed on Jun. 25, 1999, provisional application No. 60/211,649, filed on Jun. 15, 2000, and provisional application No. 60/218,884, filed on Jul. 18, 2000.

(51) Int. Cl.$^7$ ............................................... B62D 63/00
(52) U.S. Cl. ......................... 280/32.7; 280/63; 280/492
(58) Field of Search ................................ 280/32.7, 492, 280/493, 494, 63, 64–77, 2; 180/16, 14.1; 56/14.9, 15.5, 15.7, 15.9

(56) References Cited

U.S. PATENT DOCUMENTS

| | | | |
|---|---|---|---|
| 5,514 A | * | 4/1848 | Woodcock .................... 280/63 |
| 363,221 A | * | 5/1887 | Fellows ....................... 280/63 |
| 384,820 A | * | 6/1888 | Barrett ........................ 280/63 |
| 429,784 A | * | 6/1890 | Turner ......................... 280/63 |
| 448,015 A | * | 3/1891 | Frick et al. .................... 280/63 |
| 504,043 A | * | 8/1893 | Luke ........................... 280/63 |
| 1,334,559 A | | 3/1920 | Schaumburg |
| 1,590,582 A | * | 6/1926 | Johnson et al. ............... 280/63 |
| 2,474,964 A | * | 7/1949 | White .......................... 280/63 |
| 2,507,855 A | * | 5/1950 | Drew .......................... 280/63 |
| 2,537,521 A | | 1/1951 | Forbes |
| 3,379,452 A | | 4/1968 | Torrisi |
| 3,434,739 A | | 3/1969 | Schoonover |
| 3,498,639 A | | 3/1970 | Hawk |
| 3,524,514 A | | 8/1970 | Kratzke |
| 3,664,431 A | | 5/1972 | Tatianko et al. |
| 3,669,469 A | | 6/1972 | Hartelius |
| 3,731,946 A | | 5/1973 | Westcott |
| 3,759,541 A | | 9/1973 | Peterson |
| 3,834,726 A | | 9/1974 | Hobza |
| 3,912,300 A | | 10/1975 | Bryan, Jr. |
| 3,946,822 A | | 3/1976 | Dohse et al. |
| 4,010,507 A | | 3/1977 | Johnson |
| 4,045,050 A | | 8/1977 | Hawk |
| 4,079,955 A | | 3/1978 | Thorpe et al. |
| 4,232,754 A | | 11/1980 | Corrigan et al. |

(List continued on next page.)

OTHER PUBLICATIONS

Printout from Internet Web Site www.trimmertrap.com—shows reasonable facsimile of Applicant's Invention.*
Turf Rider, Inc. "Stand Up Sulky" Operator's Manual Turf Rider Minnetonka, MN Prior to Dec. 1999.
Wright Manufacturing, Inc. "Literature Bag" Wright Manufacturing, Inc. 1991–1994 Gaithersburg, MD.
Jungle Jim's, "Jungle Wheels" Advertisement Jungle Jim's, Louisville, KY US Prior to Dec. 1999.
Velke, Velke Sulky Advertisement Wright Manufacturing, Gaithersburg, MD US 1996.

*Primary Examiner*—Brian L. Johnson
*Assistant Examiner*—Bryan Fischmann
(74) *Attorney, Agent, or Firm*—Theresa Fritz Camoriano; Camoriano and Associates

(57) ABSTRACT

A preferred embodiment of a sulky includes a removable, adjustable foot platform, replaceable axles, and a hitch including stops that limit the extent of pitch, roll, and yaw motions between the sulky and the towing vehicle. The foot platform preferably projects downwardly from the frame on which the axles are mounted. The foot platform is mounted on a frame, and the frame preferably is structurally stronger than the foot platform.

17 Claims, 6 Drawing Sheets

U.S. PATENT DOCUMENTS

| | | |
|---|---|---|
| 4,263,977 A | 4/1981 | Willett |
| 4,326,367 A * | 4/1982 | Cashman .................. 280/63 X |
| 4,353,572 A | 10/1982 | McCain |
| 4,444,409 A | 4/1984 | Garrison |
| 4,588,199 A | 5/1986 | Fisher |
| 4,610,457 A * | 9/1986 | Harmon |
| 4,664,403 A | 5/1987 | Livingston |
| 4,732,401 A * | 3/1988 | Siemon .................... 280/63 X |
| 4,758,011 A * | 7/1988 | Simmons .................... 280/63 |
| 4,828,282 A | 5/1989 | Pinto |
| 4,876,846 A | 10/1989 | Torras |
| 5,004,251 A | 4/1991 | Velke et al. |
| 5,020,813 A * | 6/1991 | Gottschalk .................. 280/204 |
| 5,076,599 A | 12/1991 | Lockett et al. |
| 5,118,123 A | 6/1992 | Betrock |
| 5,388,850 A | 2/1995 | Simone |
| 5,413,364 A | 5/1995 | Hafendorfer |
| 5,540,308 A * | 7/1996 | Wians ....................... 180/14.1 |
| 5,564,721 A | 10/1996 | Wians |
| 5,575,140 A | 11/1996 | Bermes et al. |
| 5,697,623 A | 12/1997 | Bermes et al. |
| 5,697,980 A * | 12/1997 | Otani et al. .................... 623/16 |
| 5,810,371 A | 9/1998 | Velke |
| 5,813,679 A | 9/1998 | Hobrath |
| 5,842,707 A | 12/1998 | Smith |
| 5,882,020 A | 3/1999 | Velke |
| 5,909,887 A | 6/1999 | Hobrath |
| 5,947,505 A | 9/1999 | Martin |
| 5,964,358 A | 10/1999 | Hafendorfer et al. |
| 6,000,705 A | 12/1999 | Velke |
| 6,062,582 A | 5/2000 | Martin |
| 6,145,855 A * | 11/2000 | Bellis, Jr. .................. 280/32.7 |
| 6,161,852 A * | 12/2000 | Bergling ...................... 280/63 |
| 6,349,955 B1 * | 2/2002 | Cottard et al. .............. 280/204 |

* cited by examiner

SULKY WITH REMOVABLE FOOT PLATE

This application is a continuation-in-part of, and incorporates by reference U.S. patent application Ser. No. 09/474,383, filed Dec. 29, 1999, now U.S. Pat. No. 6,145,855. It also claims priority from and incorporates by reference Provisional Application Ser. No. 60/141,186, filed Jun. 25, 1999, Provisional Application Ser. No. 60/211,649, filed Jun. 15, 2000, and Provisional Application Ser. No. 60/218,884, filed Jul. 18, 2000, relating to a sulky.

BACKGROUND OF THE INVENTION

One of the problems with known sulkies is that they wear out with use. They generally sit very low to the ground, and they hit curbs, rocks, stumps, and uneven ground, which tends to deform the entire sulky and to erode the edges of the sulky. Even contact with grass erodes the edges of the sulky over time. Many of these problems could be alleviated by raising the floor of the sulky, but then it would not function properly. The floor must be low, because the operator must have a low center of gravity for stability and in order to comfortably reach the controls of the vehicle that is pulling the sulky. The wear and tear of a sulky during normal use also may bend the shafts which support the sulky's wheels.

The mechanism for securing the sulky to the tow vehicle is also of importance for the sulky and its rider. Greater degrees of freedom of movement allow the sulky to better follow the terrain and to ride over an obstruction instead of crashing against it and deforming the sulky. The ability to ride over an obstruction, coupled with limits on how far the sulky will move when riding over such an obstruction, provide a more comfortable ride for the operator. Sulkies typically have a mounting plate or some other type of mounting bracket that mounts to the back of the vehicle, and there are linkages between the sulky and the mounting plate which permit the platform to shift relative to the vehicle. The following standard definitions will aid in the description of the types of relative motion between the platform and the vehicle:

1. Pitch motion means pivoting about a horizontal left-to-right axis.
2. Roll motion means pivoting about a horizontal front-to-back axis.
3. Yaw motion means pivoting about a vertical axis.

SUMMARY OF THE INVENTION

The present invention provides a sulky which has many of the advantages of Applicant's prior design, and it solves the problem of sulkies which erode and distort with wear.

The sulky of the present invention includes a sturdy, rigid frame, which is at a relatively high elevation above the ground, and a foot platform which removably connects to the frame by bolts or other known removable connectors and projects down from the rigid frame to a lower elevation. With this design, if the sulky hits a curb, a rock, or a high spot in the ground, damage is confined to the foot plate, which can easily be removed and replaced. A preferred embodiment of the sulky also includes removable, replaceable axles, so that, if an axle is bent or otherwise damaged during use, it can readily be replaced.

The sulky of the present invention may be towed via a hitch mechanism which allows limited pitch, roll, and yaw motion of the sulky for the comfort and security of the operator as well as for the durability of the sulky.

DESCRIPTION OF THE PREFERRED EMBODIMENTS

Figure 1:
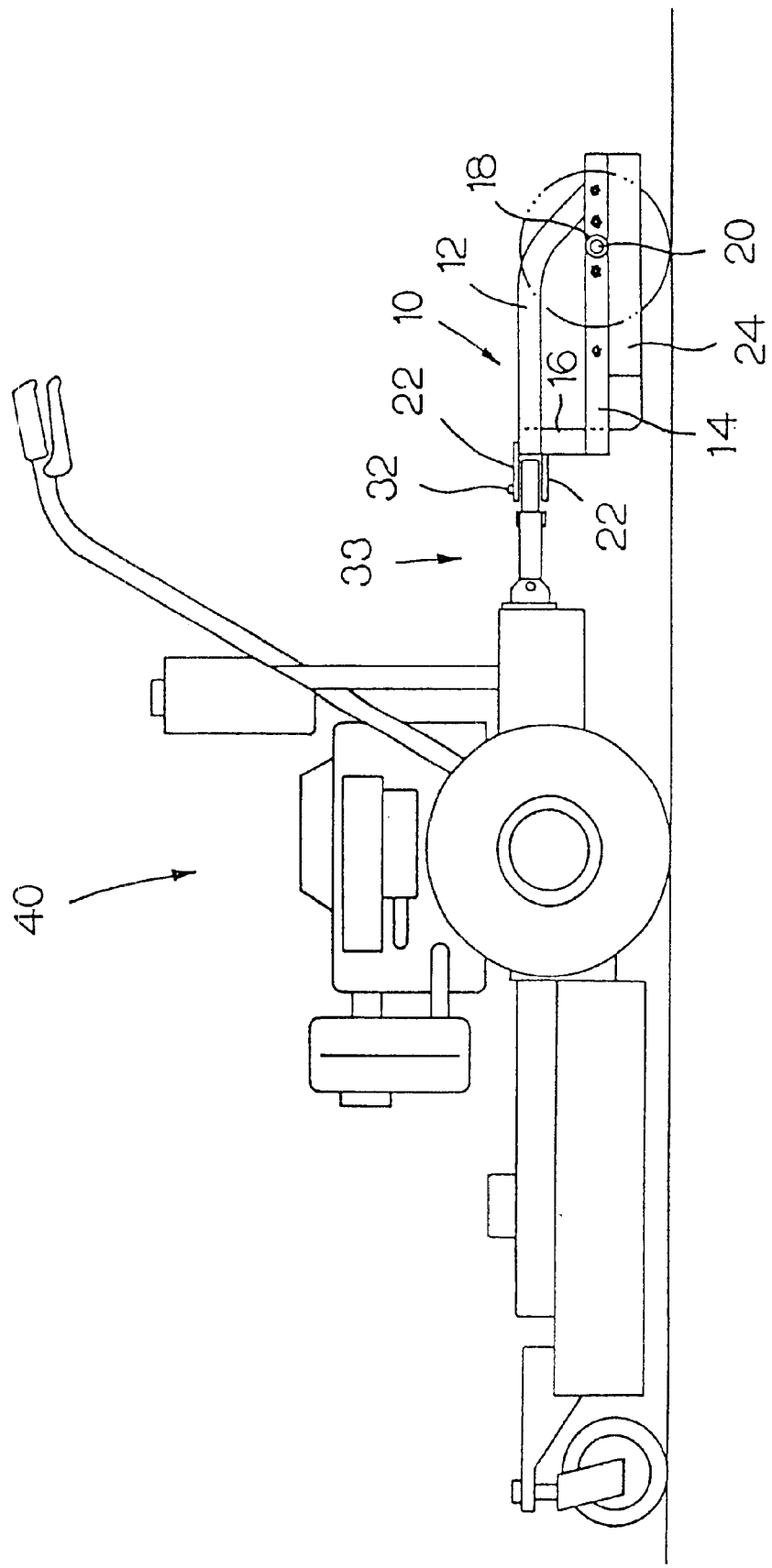
FIG. 1 is a side view of a sulky made in accordance with the present invention connected to a mower—the sulky's wheels being shown in phantom.
Figure 2:
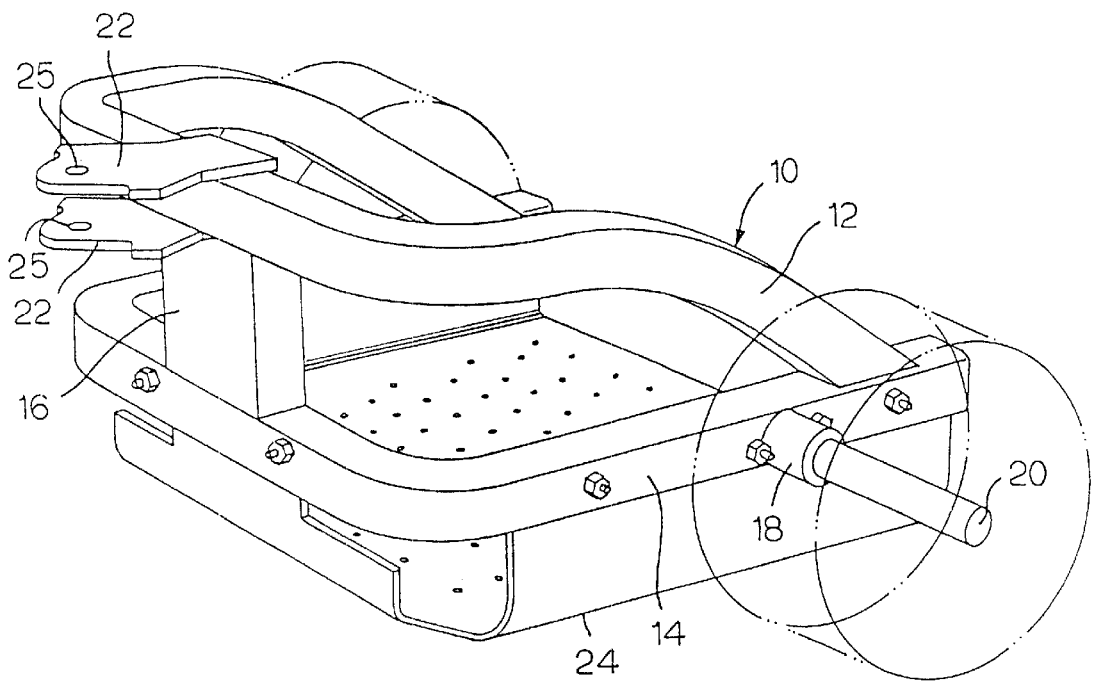
FIG. 2 is a front perspective view of the sulky of FIG. 1.

The sulky of FIGS. 1–11 has a frame 10 made of upper and lower hollow structural beams 12, 14 (in this embodiment the beams are made of square tubing, but they could also be made of channels, other formed beams, or other strong, structural members) that have been bent into a substantially U-shape. A vertical connector 16, also made of a hollow structural beam, is welded between the upper and lower beams 12, 14 to maintain them a fixed distance apart. Axle supports 18 are mounted on the lower beams 14 and project outwardly, and stub axles 20 are mounted in those axle supports 18 and into the beam 14. The axle supports 18 are welded to the outside of the beam 14. As shown best in FIG. 3, the stub axles 20 include an inner flange 21 with outwardly-projecting bolts 23 welded to the flange 21. Each stub axle 20 is mounted onto the frame 10 by inserting the axle from the inside of the frame member 14, through an opening in the frame member 14, and through the axle support 18. The bolts 23 are extended through holes in the frame member 14, and nuts on the outside of the frame member 14 are tightened onto the bolts 23 until the flange 21 of the stub axle abuts the inner surface of the frame member 14, holding the stub axle in a fixed position on the frame member 14. The wheels are then mounted on those axles 20. This puts the bottom of the lower beam 14 about four inches off of the ground and the center of the axle 20 about 5 inches to 5.5 inches off the ground.

The upper and lower beams 12, 14 extend in a substantially horizontal direction, with the lower beams 14 extending at a first height and the upper beams extending at a second height. The axles 20 project substantially horizontally from the lower beams 14 at the first height.

Upper and lower hitch plates 22 are fixed to the upper beam 12, preferably by welding, putting them 12–14 inches off of the ground. The upper hitch plate 22 has a hole 25 that is aligned with a hole 25 in the lower hitch plate 22 to receive a vertical pin, which will be described later.

Figure 3:
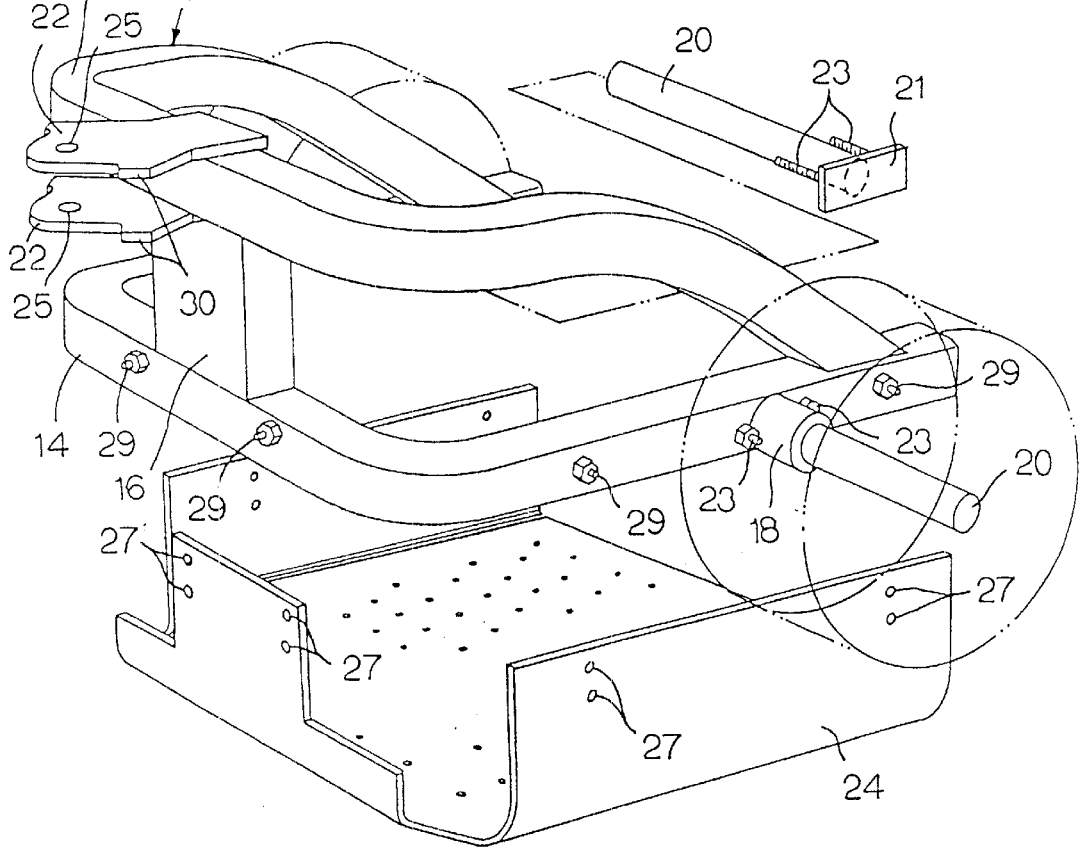
FIG. 3 is an exploded front perspective view of the sulky of FIG. 2.
Figure 4:
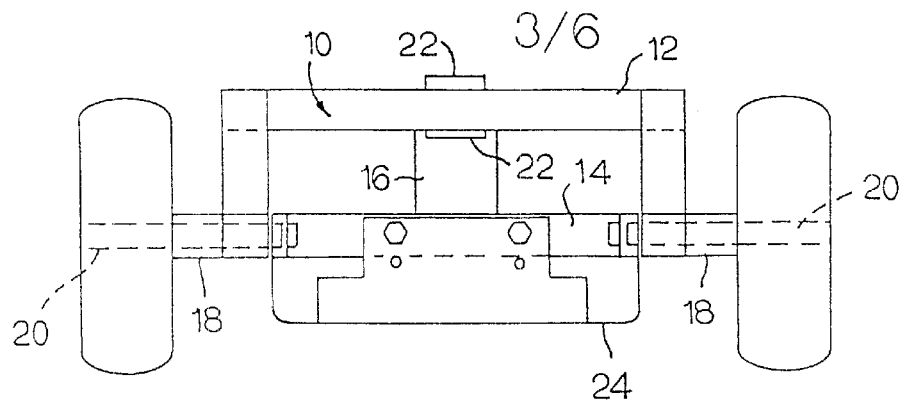
FIG. 4 is a front view of the sulky of FIG. 1.
Figure 5:
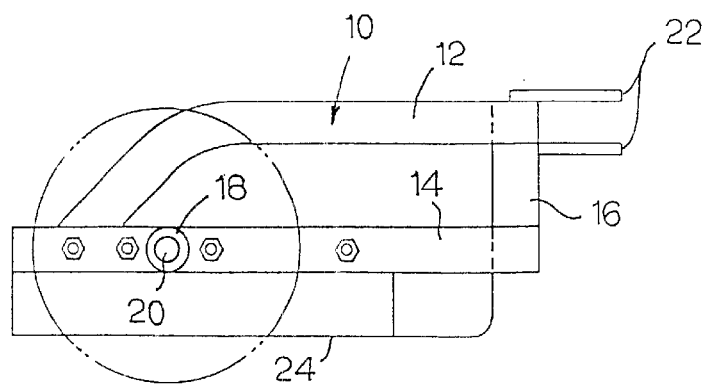
FIG. 5 is a side view of the sulky of FIG. 2.
Figure 6:
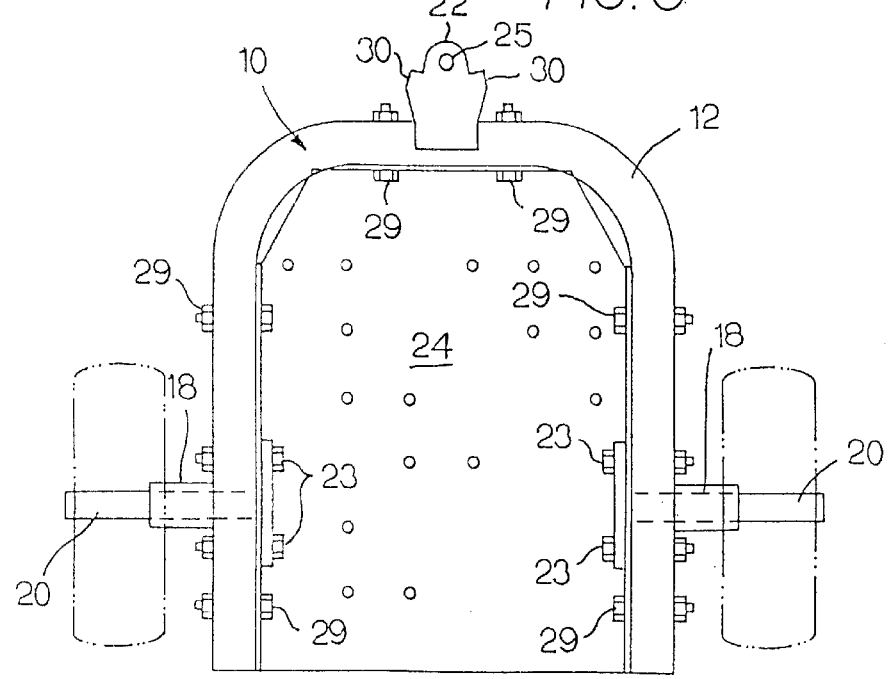
FIG. 6 is a top view of the sulky of FIG. 2.

The foot platform 24 is a flat sheet of metal which has been formed so that the front and sides of the sheet are bent upwardly to connect to the lower frame member 14. As shown in FIG. 3, the foot platform 24 has a plurality of sets of holes 27, which are used to bolt the foot platform 24 to the lower frame member 14. In this preferred embodiment, there is an upper set of holes 27 and a lower set of holes 27. Two bolts 29 are inserted through the holes 27 and through the lower frame member 14 in the front, two on the left side, and two on the right side, and nuts are tightened onto the bolts 29 to hold the foot platform 24 in place. If the upper set of holes is used, the foot platform will be lower to the ground, and, if the lower set of holes is used, the foot platform will be mounted at a higher elevation relative to the ground.

The foot platform 24 is surrounded by the U-shaped frame portion 14 and extends downwardly from the U-shaped frame portion 14 to an elevation that is both lower than the bottom of the frame portion 14 and lower than the axles 20.

While it is preferable to bolt the foot platform 24 onto the frame as shown here, the foot platform 24 may alternatively be tack welded to the frame or fastened to the frame by other known means. The foot platform 24 preferably projects downwardly approximately 1.5 to 2 inches from the frame, so that, when the bottom of the frame is 4 inches off the ground, the foot platform is 2–2.5" off the ground.

Since the foot platform is made of a sheet material, while the frame is made up of much stronger structural beams, if the foot platform hits a curb or other obstruction, it may erode or deform, but it will not cause the frame to deform or otherwise cause damage to the frame. The foot platform 24 thus becomes an expendable item, which can readily be removed and replaced without having to replace the entire sulky.

Similarly, if the axles 20 are bent or otherwise damaged during use of the sulky, they can readily be removed simply by removing the associated wheel, removing the nuts mounted on the bolts 23, and sliding the stub axle 20 out of the frame 14. A new stub axle 20 may then be installed quickly and economically.

Looking at the front portion of the sulky, it can be seen that the upper and lower hitch plates 22 each have left and right outwardly-projecting arms 30, which prevent the sulky from pivoting too far to the left or right relative to the mower or other towing vehicle. When the sulky is pivoting about the vertical axis of the pivot pin 32 relative to the towing vehicle, one of the arms 30 will abut the hitch mechanism and serve as a stop to prevent the sulky from pivoting too far about that vertical axis, thus limiting the yaw motion of the sulky.

Figure 7:
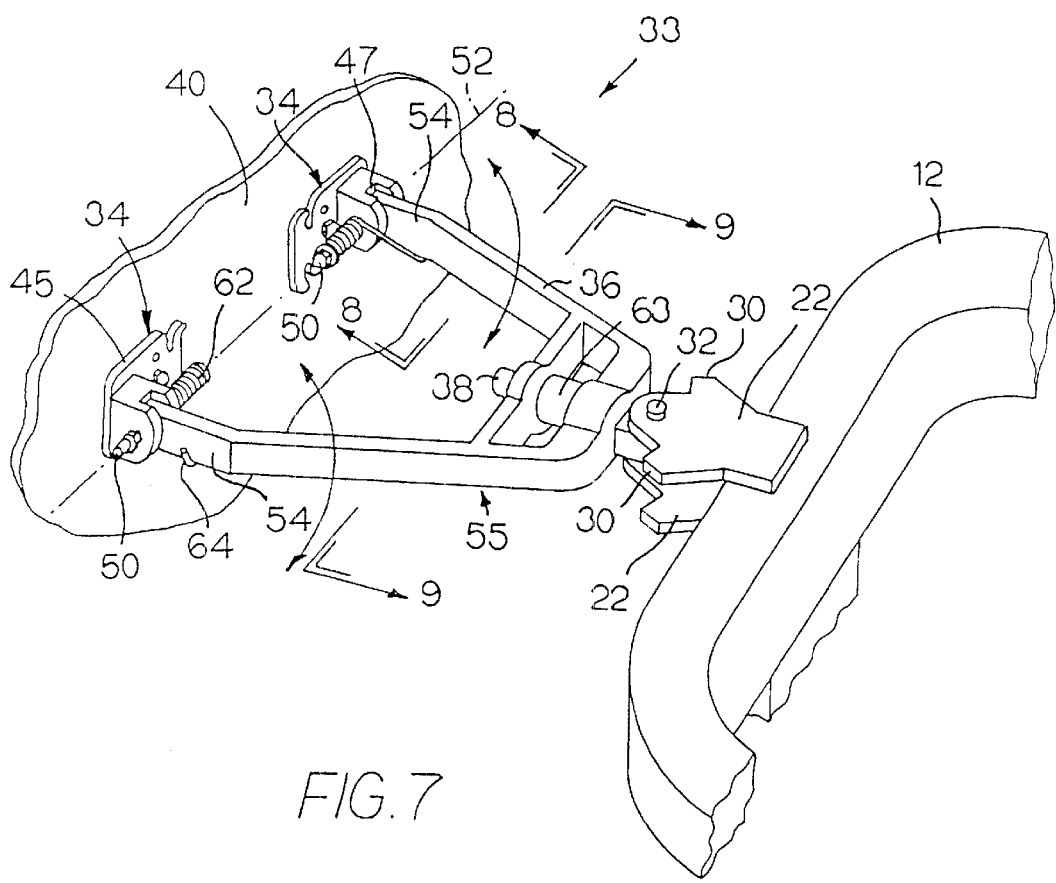
FIG. 7 is a perspective, broken away view of the sulky of FIG. 1 secured to a tow vehicle via a hitch.
Figure 8:
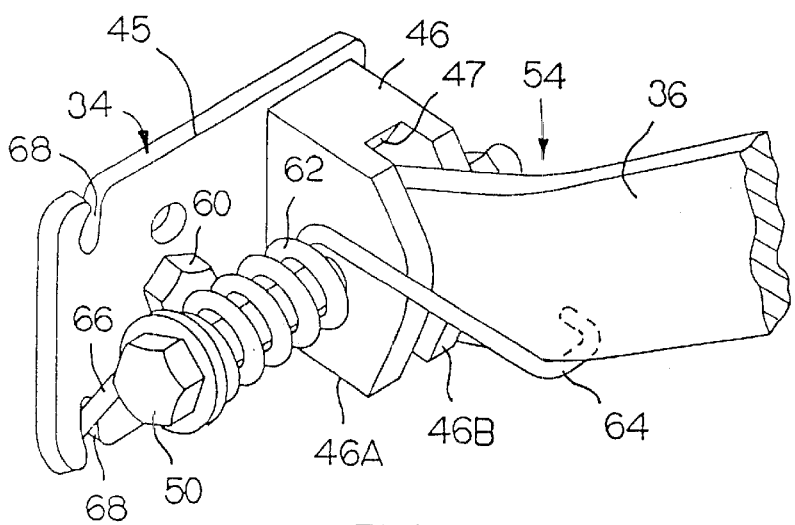
FIG. 8 is a perspective, broken away, detail view taken along the line 8—8 and showing one of the brackets that mounts the sulky to the tow vehicle to permit rotation about a left-to-right horizontal axis to provide pitch motion.
Figure 9:
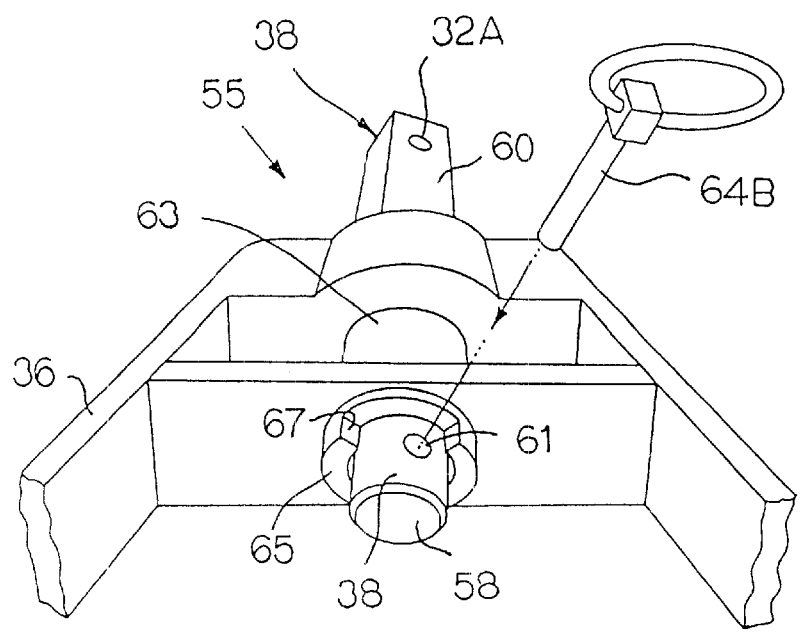
FIG. 9 is a perspective, broken away view along line 9—9 of FIG. 7.
Figure 11:
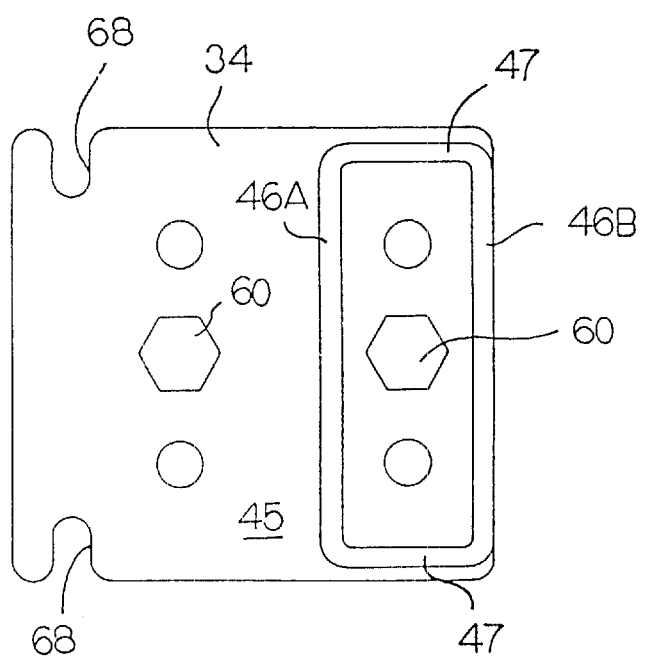
FIG. 11 is a view of one of the mounting brackets of FIG. 1, looking toward the mower.

Referring now to FIGS. 7–11, a linkage arrangement 33 includes mounting brackets 34, a U-shaped mounting yoke or arm 36, a connecting shaft 38, and the upper and lower plates 22 fixed to the frame 12 of the sulky 10. The L-shaped mower mounting brackets 34, shown best in FIGS. 8 and 11, are secured to the rear of the self-propelled vehicle by bolts 60, although they could also be connected by welding or other known means. Each mounting bracket 34 includes a pair of upper holes, a pair of central holes, and a pair of lower holes, through which the bolts 60 can pass to provide height adjustment. In this view, the bolts 60 pass through the central set of holes. Each mounting bracket 34 includes one leg 45 that lies flat against the rear surface of the vehicle 40 and another leg 46, having left and right side walls 46A, 46B and at least a top web 47 connecting the left and right side walls 46A, 46B, to form an inverted U-shaped cross-section. In this embodiment, there is also a bottom web 47 connecting the left and right side walls so that the bracket can be reversed and used on the other side, and this adds a bottom closure to the U-shaped cross-section, giving the leg 46 a rectangular cross-section. The leg 46 projects rearwardly and defines left-to-right horizontal holes (not visible). The holes of the left and right brackets 34 are aligned and receive bolts 50, that are used to mount the connecting arm 36 to the mounting bracket 34. The connecting arm 36, shown in FIG. 7, is a substantially U-shaped yoke, including two vehicle mounting ends 54 and a central portion 55 that mounts to the coupler shaft 38. The vehicle mounting ends 54 of the connecting arm 36 define holes which are aligned with the respective holes in the bracket legs 46A, 46B, and the bolts 50 extend through the respective holes in the bracket legs 46a, 46B and through the respective holes in the mounting ends 54 of the connecting arm 36 to pivotably mount the connecting arm 36 on the mounting brackets 34. This permits the connecting arm 36 to pivot up and down (pitch motion) relative to the vehicle 40 about a left-to-right horizontal axis 52. The upper web 47 of the bracket projection 46 serves as a stop, limiting the amount of pitch. Once the connecting arm 36 rotates upwardly relative to the brackets 34 a certain distance, it will contact the upper wall 47, thereby limiting the pitch. The lower wall 47 also limits downward pitch of the sulky relative to the mower.

Figure 10:
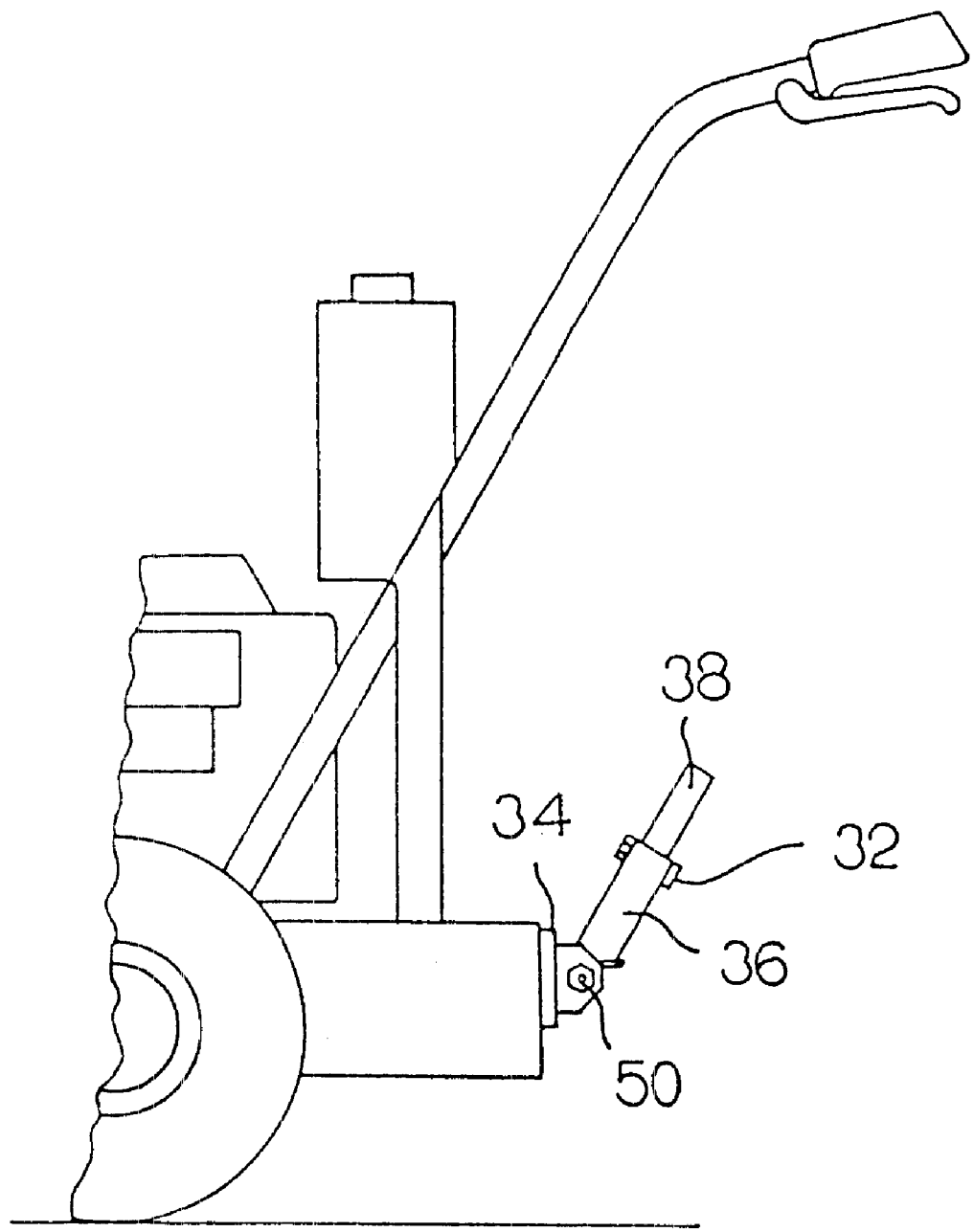
FIG. 10 is a view of the mower and hitch of FIG. 1 with the sulky removed.

It should be noted that a spring 62 is mounted on each of the bolts 50. The spring 62 wraps around its respective bolt 50 and has two free ends. The first free end 64 wraps under the arm 36, and the second free end 66 extends into a slot 68 on the bracket 34. The springs 62 bias the yoke 36 upwardly so that, when the sulky is removed from the yoke 36, the springs 62 cause the yoke 36 to pivot upwardly relative to the mower, as shown in FIG. 10, leaving the yoke mounted to the mower but in a position in which it does not interfere with using the mower.

The front of the frame 12 is mounted to the connecting arm 36 through the coupler shaft or connecting shaft 38, as shown in FIG. 7. The coupler shaft 38 has a round cross-section in the forward portion 58 (See FIG. 9), which mounts to the connecting arm 36, and it has a square cross-section in the rear portion 60, which mounts between the plates 22 that are fixed to the frame 12. There is a forward-to-rear directed tube 63 fixed on the central portion 55 of the connecting arm 36, which receives the round cross-section forward portion 58 of the coupler shaft 38. A vertical hole 61 in the round cross-section portion 58 of the coupler 38 receives a linch-pin 64B, which retains the coupler shaft 38 on the connecting arm 36. A forward projection 65 of the tube 63 has two recesses 67 cut into its forward edge. The linch pin 64B lies in those recesses 67. As the connecting shaft 38 rotates about the front-to-back horizontal axis, in the roll direction, the linch-pin 64B will contact the sides of these recesses 67, thereby limiting the roll of the sulky 10 relative to the mower 40. The hole 32A in the rear portion of the coupler shaft 38 receives the pin 32, which extends through the mounting plates 22.

Thus, the mounting arrangement provides for pitch, roll, and yaw motion of the sulky relative to the towing vehicle, while also providing limits for all three types of motion.

It will be obvious to those skilled in the art that modifications may be made to the embodiments described above without departing from the scope of the present invention.

What is claimed is:

1. A sulky, comprising:
   a frame comprising at least one formed, structural member extending in a substantially horizontal direction at a first height;
   a foot platform removably mounted on said frame and projecting downwardly from said frame at least one inch;
   first and second horizontal axles mounted on and projecting from said frame at said first height;
   wheels mounted on said axles; and a hitch mounted to said frame for hitching said frame to a towing vehicle, said hitch including at least one left-to-right horizontal shaft to provide for pitch motion and at least one vertical shaft to provide for yaw motion between said sulky and the towing vehicle.

2. A sulky as recited in claim 1, wherein said foot platform has less structural strength than said frame, so that said foot platform may be deformed without deforming said frame.

3. A sulky as recited in claim 1, wherein said foot platform is bolted to said frame.

4. A sulky as recited in claim 3, wherein one of said foot platform and said frame defines upper and lower sets of holes, permitting the height of the foot platform relative to the frame to be adjusted.

5. A sulky as recited in claim 1, wherein said formed structural member includes a substantially horizontally-extending U-shaped portion defining left, right, and front sides, and said U-shaped portion surrounds said foot platform.

6. A sulky as recited in claim 5, wherein said foot platform is fastened at least to said left and right sides of said U-shaped portion.

7. A sulky as recited in claim 6, wherein said foot platform is also fastened to said front side of said U-shaped portion.

8. A sulky as recited in claim 6, wherein one of said foot platform and said frame member defines upper and lower sets of holes, and the other of said foot platform and said frame member defines at least one aligned set of holes; and further comprising a plurality of bolts securing said foot platform to said left and right sides of said U-shaped portion through one of said upper and lower sets of holes and through said aligned set of holes, wherein the height of said foot platform relative to said frame can be adjusted by selecting one of the upper and lower sets of holes.

9. A sulky, comprising:
a frame comprising at least one formed, structural member;
a foot platform removably mounted on said frame and projecting downwardly from said frame at least one inch;
first and second horizontal axles mounted on said frame; and wheels mounted on said axles;
wherein said first and second axles each define a flange, and said flanges are bolted to said frame.

10. A sulky, comprising:
a frame;
a hitch arrangement mounted to said frame for hitching said frame to a towing vehicle, including a spring-biased mounting arm;
a foot platform releasably mounted on and projecting downwardly from said frame;
left and right axles bolted to said frame and projecting outwardly from said frame; and
wheels mounted on said axles.

11. A sulky, comprising:
a frame;
a hitch arrangement mounted to said frame;
a foot platform releasably mounted on and projecting downwardly from said frame;
left and right axles bolted to said frame and projecting outwardly from said frame; and
wheels mounted on said axles;
wherein said hitch arrangement includes at least one left-to-right horizontal shaft, at least one forward-to-rear horizontal shaft, and at least one vertical shaft in order to provide for pitch, roll, and yaw motions between the sulky and the towing vehicle.

12. A sulky as recited in claim 11, wherein said hitch arrangement also includes at least one stop which limits the extent of at least one of the pitch, roll, and yaw motions.

13. A sulky as recited in claim 12, wherein said hitch arrangement includes stops which limit the extent of the pitch, roll, and yaw motions.

14. A sulky as recited in claim 11, and further comprising a spring mounted on said left-to-right horizontal shaft to bias the hitch arrangement upwardly.

15. A sulky, comprising:
a rigid, substantially U-shaped frame;
a less rigid foot platform bolted onto and projecting downwardly from said frame;
first and second axles bolted to said frame;
first and second wheels mounted on said first and second axles, respectively;
a hitch mounted on the front portion of said sulky, including three axes of rotation, a pitch axis, a roll axis, and a yaw axis; and
stops which limit the amount of pitch, roll, and yaw of said hitch.

16. A sulky as recited in claim 15, and further comprising a spring biasing said hitch upwardly.

17. A sulky, comprising:
a frame comprising at least one substantially horizontal U-shaped portion having left, right, and front sides;
a foot platform removably secured to the frame, with the foot platform surrounded by said U-shaped frame portion and extending downwardly from said U-shaped frame portion;
first and second axles mounted on said frame; and
wheels mounted on said axles, wherein said foot platform extends downwardly below said axles; and
a hitch projecting from the front side of said U-shaped frame member for hitching said sulky to a towing vehicle;
wherein said hitch includes at least one left-to-right horizontal shaft to permit pitch motion and one vertical shaft to permit yaw motion between the sulky and the towing vehicle.

\* \* \* \* \*